US010691080B2

(12) United States Patent
Gunzinger et al.

(10) Patent No.: US 10,691,080 B2
(45) Date of Patent: Jun. 23, 2020

(54) COMPUTERISED SYSTEM (71) Applicant: Supercomputing Systems AG, Zürich (CH)

(72) Inventors: Anton Gunzinger, Zürich (CH); Martin Dorigatti, Othmarsingen (CH); David Beyeler, Lenzburg (CH); Philipp Stadelmann, Zürich (CH); Richard Huber, Zürich (CH)

(73) Assignee: Supercomputing Systems AG, Zürich (CH)

( * ) Notice: Subject to any disclaimer, the term of this patent is extended or adjusted under 35 U.S.C. 154(b) by 204 days.

(21) Appl. No.: 15/656,247

(22) Filed: Jul. 21, 2017

(65) Prior Publication Data
US 2018/0024506 A1 Jan. 25, 2018

(30) Foreign Application Priority Data

Jul. 21, 2016 (CH) ........................................ 946/16

(51) Int. Cl.
*G06F 11/00* (2006.01)
*G05B 9/02* (2006.01)
(Continued)

(52) U.S. Cl.
CPC ................ *G05B 9/02* (2013.01); *G05B 1/01* (2013.01); *G05B 11/01* (2013.01);
(Continued)

(58) Field of Classification Search
CPC . G05B 9/02; G05B 1/01; G05B 11/01; G05B 23/0202; G05B 23/02;
(Continued)

(56) References Cited

U.S. PATENT DOCUMENTS

| 5,640,508 | A | 6/1997 | Fujiwara | |
|---|---|---|---|---|
| 8,144,734 | B2* | 3/2012 | Meloche | H04L 69/04 370/471 |
| 2004/0199817 | A1* | 10/2004 | Butcher | G06F 11/1482 714/25 |
| 2008/0168323 | A1* | 7/2008 | Clark | H03M 13/091 714/758 |

(Continued)

FOREIGN PATENT DOCUMENTS

EP 0507299 A2 10/1992

OTHER PUBLICATIONS

International Search Report for application No. CH 9462016, dated Nov. 4, 2016.

(Continued)

*Primary Examiner* — Anthony J Amoroso
(74) *Attorney, Agent, or Firm* — Oppedahl Patent Law Firm LLC (57) ABSTRACT

According to an aspect of the invention, a computerised system, in particular control system is provided, which is configured, from an input vector ($I_n$) which represents a discrete number of input variables and from a state vector ($Z_n$) which represents a discrete number of state variables, to determine a new state vector ($Z_{n+1}$) whose state variables are updated, as well as an output vector ($O_n$) which represents a discrete number of output variables, wherein the output variables are provided for controlling at least one appliance and/or for outputting information. The system comprises a plurality of computation units which in parallel determine the new state vector and the output vector from the input vector and the state vector. According to the invention, the system is configured such that at least all news state vectors are exchanged between the computation units after each cycle.

24 Claims, 8 Drawing Sheets

(51) Int. Cl.
*G06F 11/16* (2006.01)
*G05B 1/01* (2006.01)
*G05B 11/01* (2006.01)
*G05B 23/02* (2006.01)
*G06F 11/07* (2006.01)

(52) U.S. Cl.
CPC ...... *G05B 23/0202* (2013.01); *G06F 11/1633* (2013.01); *G06F 11/0796* (2013.01)

(58) Field of Classification Search
CPC ............ G05B 23/0205; G05B 23/0259; G05B 23/0262; G06F 11/1633; G06F 11/0796; G06F 11/1629; G06F 11/1637; G06F 11/165
USPC ...................... 714/25, 30, 31, 48, 49, 52, 55
See application file for complete search history.

(56) References Cited

U.S. PATENT DOCUMENTS

2009/0044041 A1\* 2/2009 Armbruster ....... H04L 12/40189
714/3
2010/0287421 A1\* 11/2010 Golowner ................ G05B 9/03
714/55
2013/0262938 A1\* 10/2013 Schmitt ................. G06F 11/085
714/48

OTHER PUBLICATIONS

Cribbens A H: "Solid-State Interlocking (SSI): An Integrated Electronic Signalling System for Machine Railways," IEE Proceedings B. Electrical Power Applications, pp. 148-158, published May 1, 1987.

\* cited by examiner

COMPUTERISED SYSTEM

The invention relates to computerised systems, in particular to control systems, with which an output variable is determined as a function of a number of input variables. The invention in particular relates to a system, upon which high safety demands are placed, for example a traffic safety system, a signal box for railways traffic, the control of a complex manufacturing facility, etc.

Figure 1:
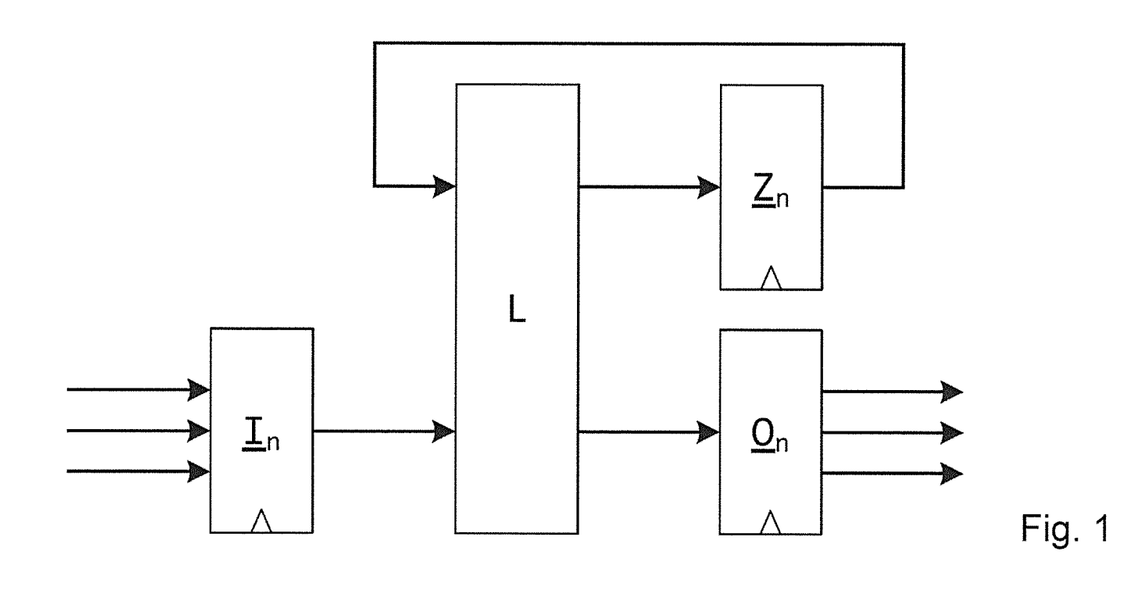
FIG. 1 the principle of a state machine.

Concerning technology, it is generally known for control systems to be able to be represented as state machines. Such systems have a few input and output signals and a few state signals, depending on the application; larger systems can have several thousand input signals, output signals and state signals. FIG. 1 schematically shows a state machine, wherein $I_n$ indicates a discrete number of input vectors representing input variables (input signals, wherein the term "signal" here is to be understood in the broadest sense and also encompasses data), L a logic, $Z_n$ the respectively current state vector and $O_n$ an output vector representing a discrete number of output variables (output signals in the broadest sense). The dimension of the vectors $I_n$, $Z_n$, $O_n$ (i.e. the number of signals per variable) is generally different.

Figure 2:
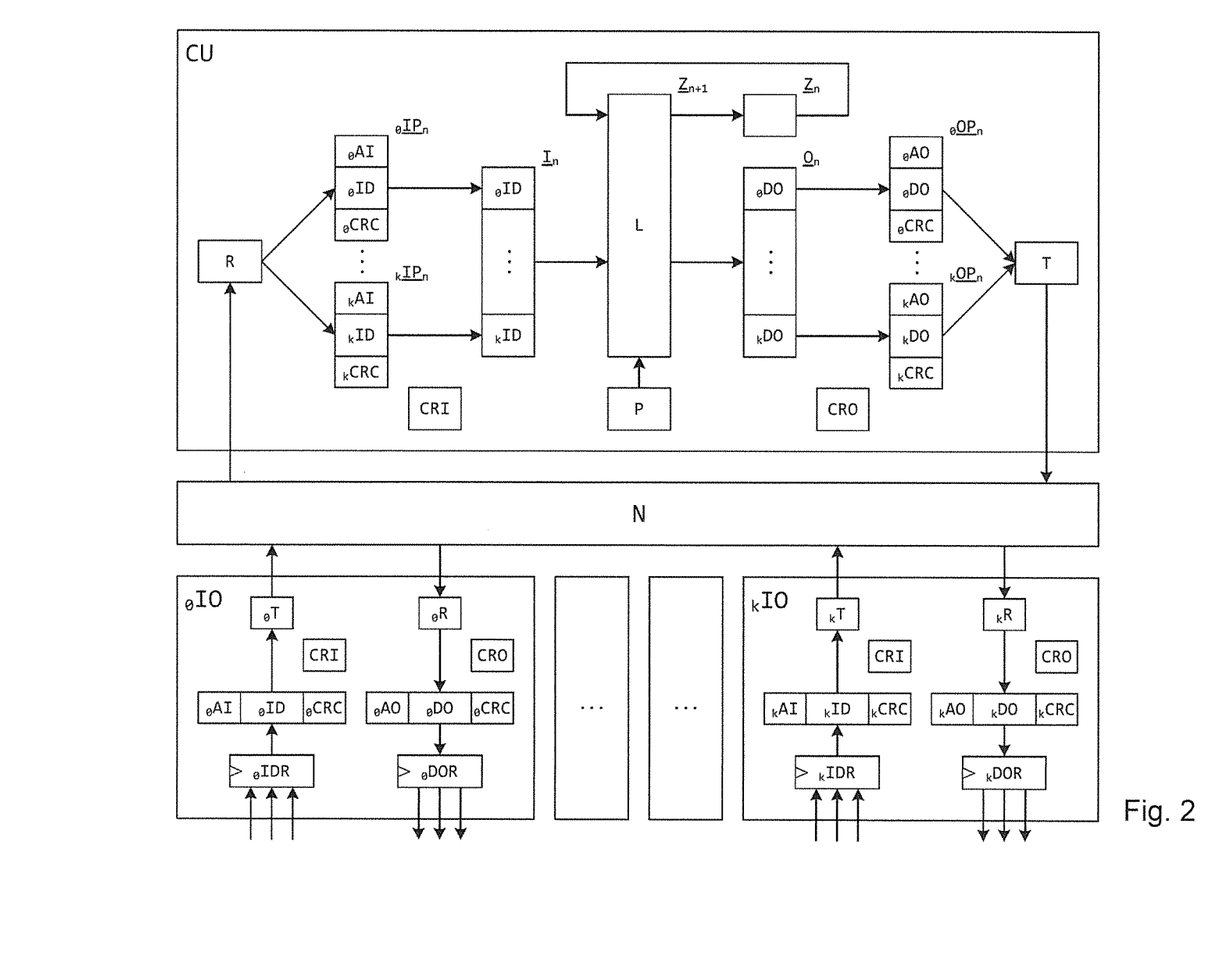
FIG. 2 a system according to the state of the art.

In practise and according to the state of the art, such systems are usually realised with a distributed input and output according to FIG. 2. Here, signals from the environment are sampled by the input and output units $_0IO \ldots _kIO$ and, as a result, sampled data $_0ID \ldots _kID$ is intermediately stored in the data register $_0IDR \ldots _kIDR$. The input and output units subsequently send the sampled data in the form of input packets $_0IP_n \ldots _kIP_n$ to a central unit CU via a network N. The output of the packets to the network here is effected via the network interface $_0T \ldots _kT$. In addition to the sampled data $_0ID \ldots _kID$, the input packets comprise further test data (target address $_0AI \ldots _kAI$, checksum $_0CRC \ldots _kCRC$, and/or other), for protection from transmission errors.

In the central unit CU, the input packets are received and tested by the receiver R. Given a successful testing, the data $_0ID \ldots _kID$ comprised in the packet is adopted into the input vector $I_n$. The logic L then images the input vector $I_n$ and the state vector $Z_n$ onto the output vector $O_n$ and the state vector $Z_{n+1}$. The output vector comprises the output data $_0DO \ldots _kDO$ for the input/output units $_0 \ldots _kIO$. Output packets $_0OP_n \ldots _kOP_n$ for the input/output units are formed from the output data present in the output vector, said output packets likewise comprising test data analogously to the input packets. The output packets are then transferred from the transmitter T to the network which transmits these to the respective input and output unit.

On the input and output units, the output packets are received and examined by the receiving chip $_0R \ldots _kR$. Given a successful examination, the output data gets to the output register $_0DOR \ldots _kDOR$ and thus to the output—for example a device which is to be controlled by the respective output unit.

In the represented example, all units that exchange signals (data or other variables) with the outside world are represented as input and output units. However, it is also possible that there are units that only form input units or only form output units. As a computation unit, programmable processors (CPU) which are controlled by a program P can be applied for carrying out the logic L. However, programmable gate arrays, so-called FPGAs are also conceivable. Here, the logic and the procedural control are located in a configuration memory P.

A computer system which is constructed according to such a manner has an error rate of about 1 error/year when implemented by way of commercially available microprocessors. Such an error rate can be tolerated in many applications, e.g. climate control, light control, entertainment, etc. However, there are also other applications concerning which a single functional failure can lead to the death of hundred of humans, e.g. control systems for railway safety technology, for atomic power stations or for aircraft.

It is already known to be able to reduce the hazard rate of a computer system by way of several computation units carrying out the same computation in parallel and transferring the results to the receiver. A failure has evidently occurred if they do not arrive at the same result. The system can thereupon react thereto with the assumption of the safe state. The safe state in the case of application in railways is "all signals to red", by which means all trains come to a standstill. Although the facility is then no longer available, however there is also no risk of any danger. As a rule, there is no safe state in the case of atomic facilities or aircraft.

An example of an error-tolerant computer system is disclosed for example in EP 1 443 399.

The components of a computers system can have a functional failure on account of random losses or breakdowns. Under certain circumstances, these functional failures can exclusively affect those functions which are seldom used on operation. In such a case, one speaks of dormant errors. The probability of the same error occurring in all parallel computation units between two applications of the function is significantly increased in the case of dormant errors. According to the state of the art, such functions are periodically tested in order to counteract this. The effort for such tests is considerable and can even surpass that for implementing the functional code.

It is an object of the invention to provide a computerised system, in particular a control system, which overcomes the disadvantages of the state of the art and which is suitable for demanding applications, with which the tolerable hazard rate is usually smaller than $10^{-8}$ errors per operating hour, preferably even with the implementation of FPGAs which are even somewhat more prone to malfunctions, and preferably without extensive tests being required for detecting dormant errors.

This object is achieved by a system as is defined in the patent claims.

According to an aspect of the invention, a computerised system, in particular control system is provided, which is configured to determine, from an input vector ($I_n$) which represents a discrete number of input variables and from a state vector ($Z_n$) which represents a discrete number of state variables, a new state vector ($Z_{n+1}$) whose state variables are updated, as well as an output vector ($O_n$) which represents a discrete number of output variables, wherein the output variables are provided for controlling at least one appliance and/or for outputting information. The system comprises a plurality of computation units which in parallel determine the new state vector and the output vector from the input vector and the state vector. According to the invention, the system is configured such that at least all new state vectors are exchanged between the computation units after each cycle.

The fact that at least the new state vectors are exchanged after each cycle means that each state vector which is computed anew by a computation unit is made available to the other computation units. The computation cycles can be carried out in a clocked manner, in a defined rhythm. However, this does not need to be the case. It is not necessary for all cycles to have the same time duration. For example, it can be the case that a new computation does not take place periodically, but is only activated by certain events, for example if an input unit notifies a change of something. In particular, this is an option when the variables (input variables, state variables, output variables) only assume discrete values, i.e. in particular when the quantity of states which the system can assume is finite (the system then represents a co-called "finite machine"). The approach according to the invention however also functions with variables which are continuously changeable.

Preferably, in addition to the state vectors, the output vectors and/or input vectors are also exchanged with each cycle. An exchange of the input vectors potentially makes sense since it is not ensured that the transfer of the input vectors from the input units on the path to the several computation units always takes its course in an identical manner.

For exchanging the respective vectors, each computation unit for example has its own exchange bus $OB^0 \ldots OB^P$, via which it transmits the result to the remaining computation units, i.e. the computation units each have the possibility of reading the data from the bus of the other computation units (but for example not of writing onto them).

In particular, the received state vectors and possibly output vectors and/or input vectors, by way of each of the computation units, can be compared with its own vectors.

In an embodiment, regular, approximately equally long cycles are carried out, wherein each cycle is typically a small number of milliseconds. This means that each data error (produced directly or by way of a program error) is a recognised and possibly acted upon already after a few milliseconds.

According to a first implementation of the present invention, a safety reaction is activated as soon as a difference is ascertained—for example by way of the computation units no longer outputting data packets and the input/output units being brought into a safe state, for example "all signals to red". For this purpose, an individual computation unit can interrupt the supply voltage for all computation units or for one or more other units, as is known from the state of the art. Supplementarily or alternatively, other measures such as a "controlled shutdown of all components" or "alarm" etc. can be provided. This implementation in particular can be preferred when the number of computation units is small, for example when it is two and/or of a particularly high degree of safety is demanded.

According to second implementation, a predefined minimum of concordant results is demanded. For example, the criterion can be such that at least 1 (1<p) concordant (matching) results is demanded for a correct implementation in the case of a number of p processors, e.g. a 6-of-8 architecture (this means that at least 6 of the present processors produce an identical result) For this purpose, one can proceed as follows:

the result of the comparison with the results of all other computation units (for example concordance y/n, comparison information) is goes, for example as a comparison result (internal vector) X, with the transferred data and is fed to all I/O units. These and/or the computation units themselves, on the basis of the vector X, can therefore create a matrix of the comparison results of all computation units and from this conclude that, at all events, one of the computation units produces erroneous results. The I/O units can also decide whether a data packet is valid, possibly on the basis of test data. If the packet is not valid, then the respective output units can ignore it and possibly optionally activate a reboot of the computation unit concerned.

the state vectors are also transferred to the output units, and then, on the basis of the state vectors and output vectors and possibly test data, the output units decide whether the computation unit concerned belongs to sufficiently large number of computation units which delivers identical data; the output unit uses the data or ignores it, depending in this.

supplementarily or alternatively (this also applies as an option for the first implementation), if the computation unit ascertains that its own state vector (and possibly output and/or input vector) is different from a pre-defined minimum number of state vectors (and possibly output and/or input vectors) which are identical to one another and are from other computation units, it then switches itself off or initiates a reboot. Analogously, such a switching-off or reboot can also be initiated by other ones of the computation units, for example by a majority or by a dedicated computation unit (master) or by an external control instance (monitoring computer).

A variant of the first or possibly second implementation is based on redundancy, by way of a redundant system being constructed from several parts-systems which are each designed according to the invention, wherein the measures which are mentioned above are only provided for that part-system, concerning which the error is ascertained, so that the other part-system can continue the operation in a non-disrupted manner without the input/outputs units having to be brought onto the safe state. This variable is described in more detail hereinafter.

The several computation units can be of a different construction type, in particular can originate from different manufacturers, so as to avoid parallel errors which are inherent of the hardware.

The error model of a computation unit (CPU, FPGA, etc.) is briefly described here for understanding the approach according to the invention. There are three possible causes of errors in a computation unit:

1. Data errors: data bits which influence the result of the computation change their value.
2. Program code errors: memory bits which determine the execution of the program change their value. The execution of the computation is changed due to this.
3. Hardware errors: individual transistors/conductors have a short-circuit/interruption.

In the computation units, the data and programs are usually stored in volatile semiconductor memories. These can change their value due to high temperatures or due to cosmic radiation. Data errors and program code errors of categories 1 and 2 in practice are roughly 1000 time more frequent that hardware errors of the category 3.

One can assume that data vectors amount to a few 10,000 bits for the applications which are considered hereinafter. The program code is 1000 to 10,000 larger, which is why the error rate here is also 100 to 10,000 times higher.

The approach according to the invention permits each of the error types to be dealt with, wherein optionally one can completely make do without extensive function tests. This specifically being due to the following reasons:

Category 1 All data errors are instantaneously recognised and cannot propagate, by way of all relevant data including the internal data of the individual computation units being mutually exchanged and examined in each computation cycle in accordance with the invention. As is explained in yet more detail hereinafter, the error can be remedied by way of a rebooting of the computation unit from a defined state. Category 2: A program code error sooner or later has the effect that a computation result is false. This incorrect result is immediately recognised by the procedure according to the invention. The program code error can be remedied by way of a renewed loading of the program code from a non-volatile memory and subsequent rebooting of the computation unit. Such a renewed loading of the program code can be envisaged for example after each determining of a false result. Alternatively, one can also envisage such an error activating a checking of the program code.

According to a group of embodiments of the invention, the program code of the individual computation units is checked again and again, even if no false computation result is present, in order to uncover program code errors. An error can be remedied by way of renewed loading of the program code from a non-volatile memory and a subsequent booting of the computation unit.

For this purpose, the computation units can mutually transfer the program code P (in the case of a CPU) or the configuration code P (in the case of FPGAs), for example in predefined intervals, examine it and, given a difference from their own program code or from a reference stored for example in a non-volatile manner, activate one or more of the above measures (safety reaction, temporary withdrawal from the system and/or rebooting).

Category 3: Hardware error. Also a hardware error will sooner or later have the effect that a computation result is false, and this is recognised on account of the procedure according to the invention. In contrast to the program code error, the hardware error which, as explained, is much rarer, is not so easy to remedy. However, for overcoming the hardware error, concerning a procedure according to the invention, so many computation units are connected in parallel that the error target is achieved over the operating duration of the system (typically 25-50 years). Computation units which repeatedly deliver false results on account of a hardware error can likewise be completely eliminated from the system on account of the mentioned adequate redundancy, without negative consequences for the complete system, Since a data error in a computation unit or also in a subsequently connected component—for example of the network—can lead to a false output vector $O_n^0 \ldots O_n^P$, and/or to a false output packet $_0 \ldots _k OP^{O_n} \ldots _0 \ldots _k OP^{P_n}$, then according to a group of embodiments, it is further suggested to provide each output packet with a signature which is individual to each computation unit. With regard to such a signature, it is the case of check data which can be produced in a manner known per se (via CRC or other algorithms), but which is individual.

The signature of the individual computation units is designed such that it is not possible for any computation unit to produce the signature of another computation unit, by which means it is ensured that the receiving unit does not erroneously accept a data packet due to a correct signature of another computation unit. One can also envisage the actual output data only occurring once in the output data packet (instead of once per computation unit) and only the signatures of all computations units which differ from one another being included.

The fact that no computation unit can produce the signature of another computation unit can be realised in different manners. For example, the computation units can use different algorithms or the same algorithm with a different key, initial value, generator polynomial etc.

In a group of embodiments, the computation units are realised as a configurable logic circuit, in particular in FPGA technology. For example, each computation unit can comprise an FPGA or be formed by such. Although FPGAs have been known per se for subsidiary functions in control systems and other computer systems for some time now, they are particularly valued on account of their favourable ratio between achievable computation performance and size. However, their application in a central unit or as a central unit of a complex system until now has been rejected, particularly because they have a reputation for operating in a more error-prone manner than conventional microprocessors which work off sequences of commands from a program memory. However, such alleged disadvantages of the configurable logic circuits are compensated and more than made up for, on account of the procedure according to the invention, wherein the big advantages are retained and can be fully exploited.

In a group of embodiments (see FIG. 9), at least two systems of the type according to the invention are brought together into a redundant system. Here, the redundant system is configured such that both systems operate independently of one another in normal operation and each carry out all necessary computations.

The two systems (central systems, "part-systems"; cf. systems CU, CU* in FIG. 9) of the mentioned type can notify the complete system state to their partner in each case, in particular at each cycle.

If the safety reaction which is discussed above is activated in one of the systems and the results cannot be used, then the other system continues to function. Thus a very high availability can be provided in the redundant system despite a high system safety. As soon as that system which has produced an error is ready for operation again, then via the data exchanged in each cycle, it can immediately synchronise itself with the other system and reassume operation.

Optionally, here the redundant system can be configured such that (part-)system which has already operated error-free for longer operates as a "master".

The system according to the invention and in particular a redundant system of the type described above can have a second redundant network $N_B$ (cf. FIG. 9) for increasing the availability.

In embodiments, the system according to the invention (for example the redundant system) moreover comprises a plurality of input and/or output units, in particular of the type which has been discussed above by way of FIG. 2. These interact with the environment by way of them determining data, for example by way of sampling, and/or carrying out an output, for example of control signals to units (for example switches), via an interface.

These input/output units (or the output units) in particular can be configured to check the consistency of the received data. For example, they can be configured to check whether all output data created by the several computation units is identical. Supplementarily or alternatively, they can be configured to examine whether all checksums of all computation units are correct. In particular, they can carry out an output via the interface only when all checksums are correct, or when a predefined minimum number of checksums is correct.

The input and/or output units can moreover be configured to go into a safe state if no data packet has been received from the central computer (central system, comprising the computation units) during a minimum time duration.

At least one of the input and/or output units can also be designed in multi-channel manner. For example—if it is (also) designed as an input unit—it can independently sample a signal (current or voltage) by way of several channels. Supplementarily or alternatively, the several independent channels can each compute the target address, the data (the data vector, as part of the input data vector) and the checksum. The checksum computation of the channels—analogously to the computation units—can be effected such that the checksums of the channels are different and the channels are not capable of computing the checksum of the respective other channel—for example by way of different initial values of a same polynomial.

The data packets produced by the input units (and possibly by the several channels), for example via the network are joined together into a communication packet $_k$IP and are supplemented with an address and checksum. From there, they are transmitted by the network to the central system. Computation units of the central system CU for example have at their disposal checksum computers which are identical to the input units and can examine whether a received data packet has been correctly transmitted from the input units. The data of the received packet is only also taken into consideration for further processing for example if all checksums are correct.

Optionally, one can envisage the central system not providing the output units $_k$IO with further packets as long as no valid packets have been received. If these are configured to go into the safe state after a certain time without having received packets, then all such units go into the safe state after a certain time on account of this.

At least some and for example all of the input units and output units can be designed as input and output units (input/output units).

The invention also relates to a control system, in particular for railway facilities, comprising a system according to the invention as well as additionally control parts (sensors, switches) which are assigned to the input and/or output units.

Principles of the invention and principles of special embodiments of the invention are hereinafter described in more detail by way of schematic drawings. The same characterisations in the drawings indicate the same or analogous elements. Concerning the description of the invention by way of FIG. 3-9, the FIGS. 1 and 2 and the notations introduced there are referred to. There are shown in.

Figure 3:
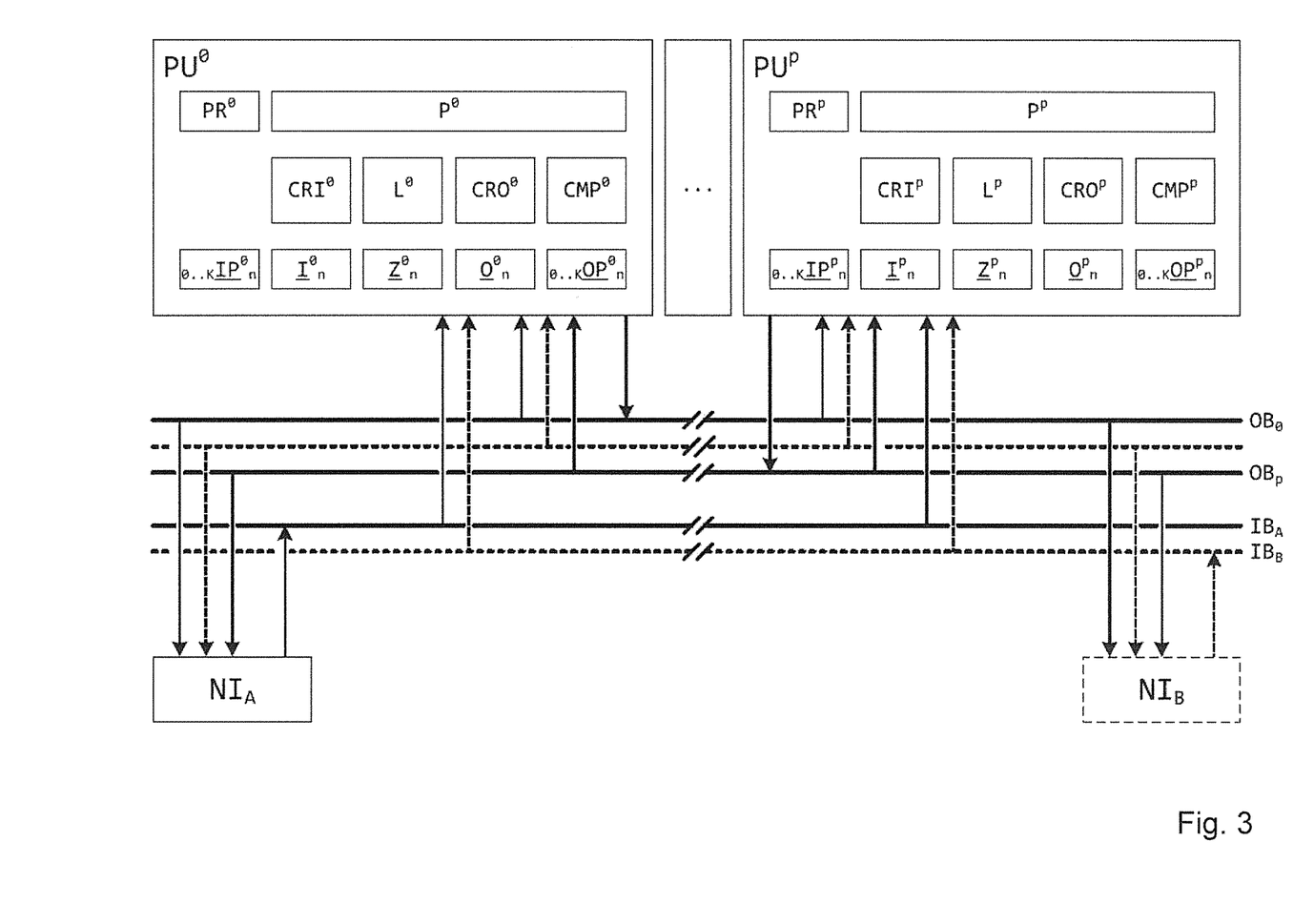
FIG. 3 a central system of a system according to the invention, with a network.

A system according to the invention is schematically represented in FIG. 3. The central unit has several parallel computation units $PU^0 \ldots PU^P$. Each of these computation units receives the input packets $IP_n{}^0 \ldots {}_kIP_n{}^p$ from the network interfaces NI and has stored the previous state vector $Z_{n-1}{}^0 \ldots Z_{n-1}{}^p$. From this, the computation units independently of one another compute the input vector $I_n{}^0 \ldots I_n{}^p$, the state vector $Z_n O \ldots Z_n{}^p$ and the output vector $O_n{}^0 \ldots O_n{}^p$.

In FIG. 3, PR (the discussed variable are each provided with an index $0 \ldots p$ which stands for the program unit) indicates the program reference memory, P the program memory, L the logic unit, CRI and CRO the checksum computer for incoming and outgoing data respectively, CMP the comparison logic which compares the computed vectors with the corresponding received vectors of the other computation units.

Figure 4:
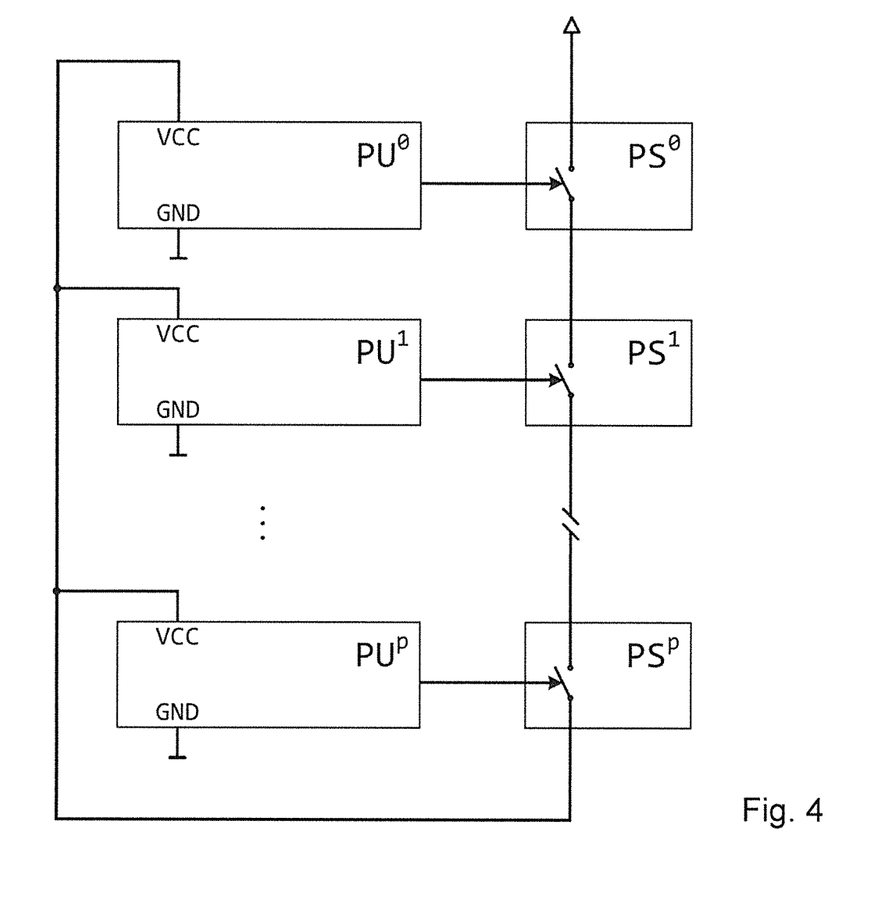

According to the invention, the computation units exchange the result amongst one another after each computation of a new state vector. For this, each computation unit for example has its own bus $OB^0 \ldots OB^P$, via which it transmits the result to the remaining computation units. The computation units then compare the results of the individual channels to one another by way of the comparison logic $CMP^0 \ldots CMP^P$. If they determine a difference, then with an embodiment according to the first implementation, they initiate a safety reaction. An example of this is schematically represented in FIG. 4. Here, this is effected by way of the supply voltage through an individual computation element being interrupted via a switch $PS^0 \ldots PS^P$ for all computation elements. It is to be ensured that for interrupting the supply voltage, the switches are always capable of doing so (for which one can fall back on methods according to the state of the art).

Supplementarily or alternatively, one can envisage the respective computation unit being rebooted and, after the reboot, linking itself into the process again with state data which comes from the other computation units.

On account of the present invention, it is ensured that a data error in the state vector cannot propagate from one computation cycle to the next. The failure disclosure time of such an error is therefore limited to the time of a computation cycle.

A data error in a computation unit can also lead to a false output vector $O_n{}^0 \ldots O_n{}^p$, or to a false output packet ${}_0 \ldots {}_kOP^{0n} \ldots {}_0 \ldots {}_kOP^{pn}$. In order to recognise such data errors, in a group of embodiments, each computation unit $PU^0 \ldots PU^P$ creates an individual signature ${}_0 \ldots {}_kCRC^{0n} \ldots {}_0 \ldots {}_kCRC^{pn}$ for each output packet. The signature of the individual computation units is designed such that it is not possible for any computation unit to produce the signature of another computation unit. This can be achieved for example by way of the computation units using different algorithms or the same algorithm with a different key, starting value, generator polynomial etc. The output packets together with the signatures are transferred from the computation units to the network interfaces NT. These network interfaces compose the output packets of the individual computation units into a message, which is represented in FIG. 5.

Figure 6:
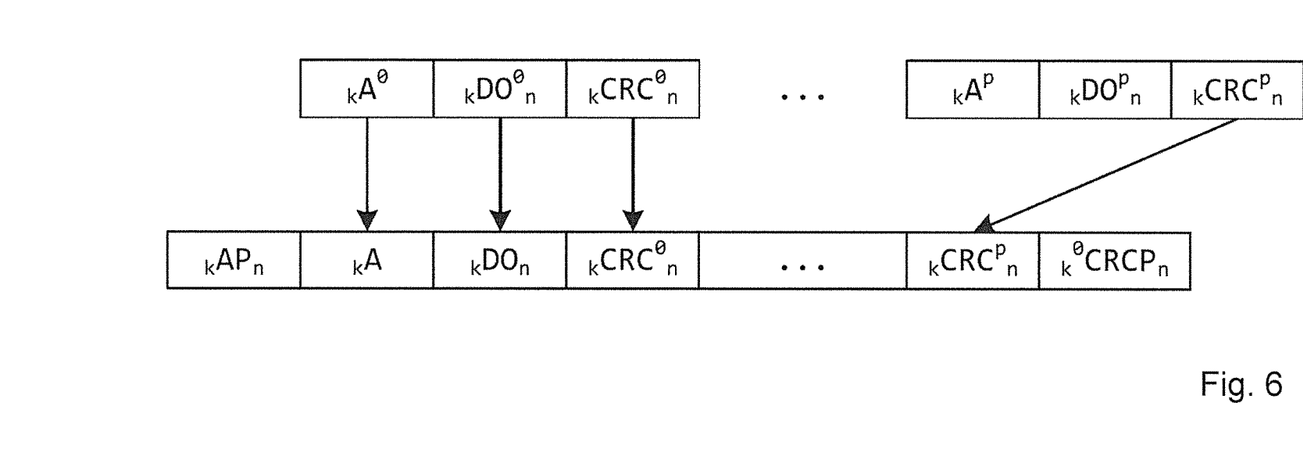
FIG. 6 an alternative for the production of a complete data packet for outputting to an input/output unit k.

In embodiments according to the first implementation, according to which differing data is not tolerated, the size of the message can optionally be reduced by way of the useful data of the output packets being comprised only once in the message. For this purpose, a protocol converter of the network interface which puts together the data packets for the network (or another unit) at the input to the network can produce a data packet as is represented in FIG. 6. If even only a single signature is not consistent with the data $_kDO_n$ which can be taken from the output vector produced by any one of the computation units, then a receiving output unit can recognise that one of the units has either wrongly computed the output data or test data (signature). In the embodiments described here, the output units are always also the input units, i.e. I/O units.

Figure 5:
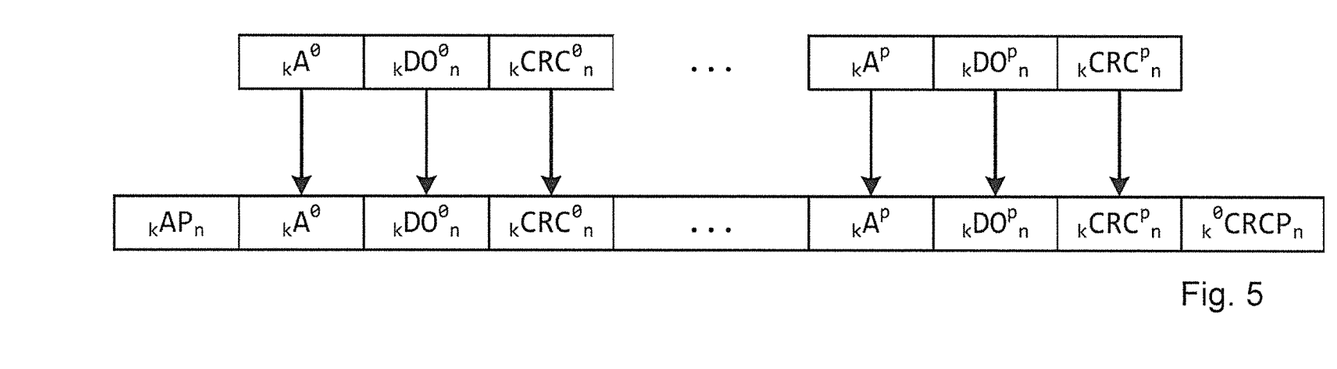
FIG. 5 the production of the complete data packet for output to an input/output unit k.

If the system is designed according to the second implementation, then for example either the messages are sent as is shown in FIG. 5, or a selection takes place in a suitable manner, so that with this it is ensured that at least the useable data (data identically computed by a sufficient number of computation units) is transferred to the output units.

Figure 7:
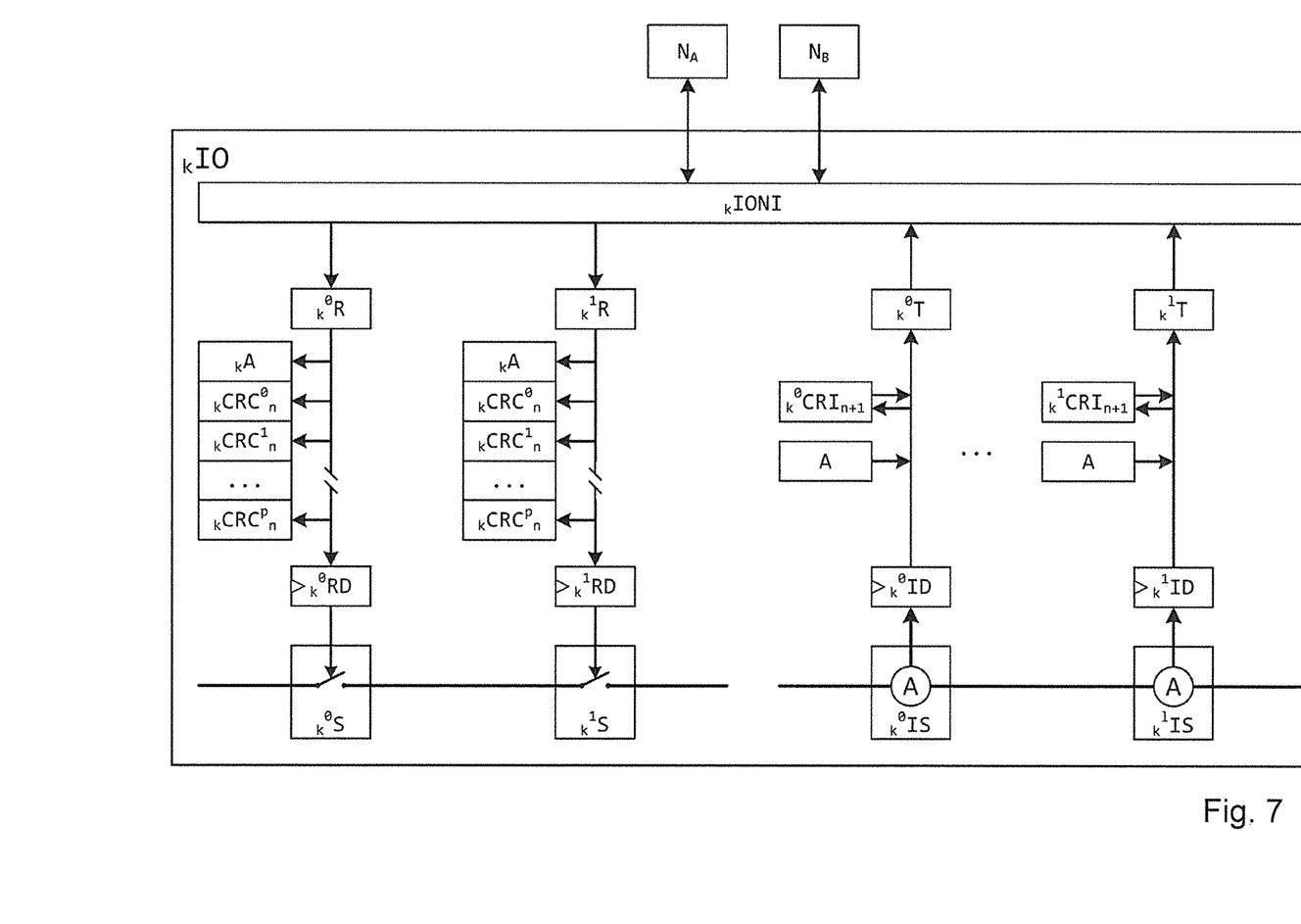
FIG. 7 an input/output unit with a network.

The construction of the input and output units according to an embodiment is shown in FIG. 7 with the example of a two-channel architecture. The example of FIG. 7 assumes that the data packets are put together as is illustrated in FIG. 6

If the channels 0 or 1 receive a message via the network interface $_k$IONI and the receivers $_{k^0}$R and $_{k^1}$R respectively, then they check the test data and signatures which are comprised therein. If a message does not have the minimum necessary number of valid signatures, then the input and output unit reject the message. Otherwise, the output data $_k$DO$_n$ gets into the output register $_{k^0}$RD or $_{k^1}$RD and thus to the output—in the illustrated embodiment—to a switch $_{k^0}$S and $_{k^1}$S respectively. On account of the present invention, it is therefore ensured that data errors in output packets do not leads to an incorrect output as long as the number of affected computation units is smaller than the minimum necessary number of valid signatures. According to the invention, the input and output units, on the basis of the signatures, can therefore ascertain whether a sufficient number of computation units have computed the output packet in a concordant manner.

Figure 8:
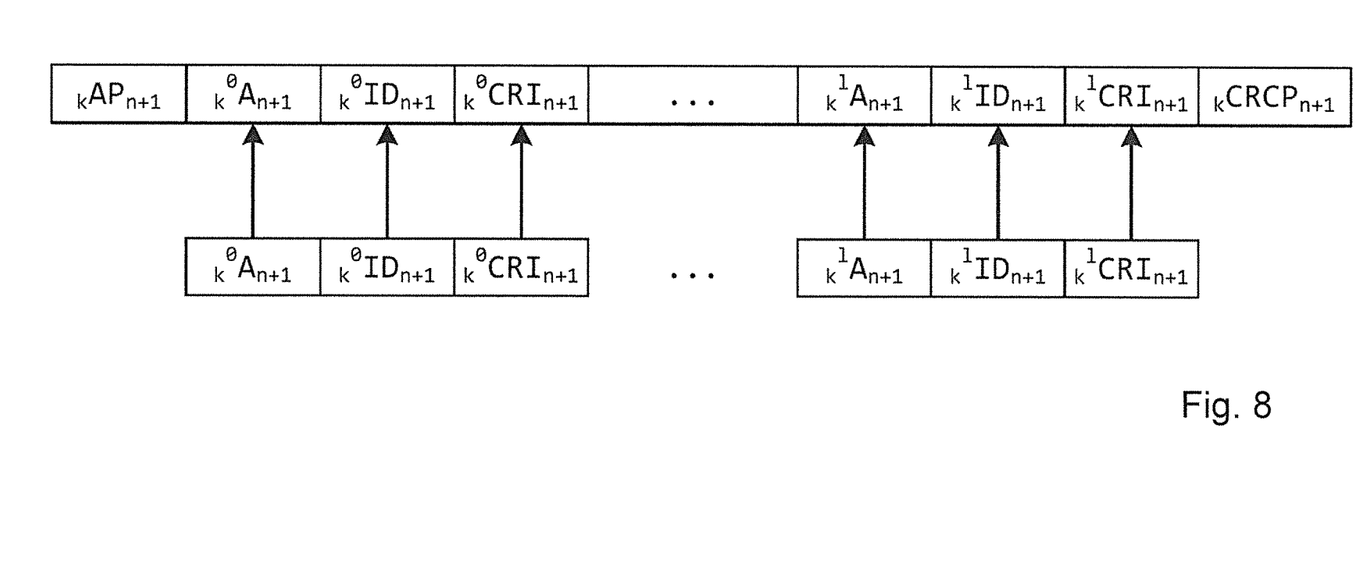
FIG. 8 the creation of a complete data packet from the input/output unit k to the central system.

Data errors can also lead to a false input packet $_0$...$_k$IP$^{0_n}$...$_0$...$_k$IP$^{P_n}$. One falls back on the same method as with the output packets, in order to recognise such errors. Here, as is usually the case, the input variables are read in via several independent sensors. FIG. 7 shows this with the example of two current sensors $_{k^0}$IS and $_{k^1}$IS. The measured values (readings) in both channels are read into an input register $_{k^0}$ID and $_{k^1}$ID respectively. Both channels subsequently compute the usual test data A and according to the invention additionally an individual signature $_{k^0}$CRC$_{n+1}$ and $_{k^1}$CRC$_{n+1}$ respectively. The same assumptions apply to these signatures as to those of the output data packets, which is to say the signatures are such that they can only be produced by the respective input/output unit. The channels produce an input packet from this data and output this packet to the network interface $_k$IONI. This, from the input packets of the channels, analogously to the output packets, produces a message as a total data packet (FIG. 8) and transmits this to the computation units PU$^0$ ... PU$^P$ of the central unit. The computation unit rejects a message if this message does not comprise the minimum necessary number of readings with a valid signature. In a second test step, as is usual, the computation units compare the readings, in order to ascertain whether the channels (in the case of multi-channel input/output units as is the case here) have concordantly measured the reading. By way of the present invention, it is therefore ensured that a data error in an input packet does not lead to a false input vector, as long as the number of affected channels is smaller than the minimum necessary number of valid signatures. According to the invention, the input and output units, on the basis of the signatures, can therefore ascertain whether a sufficient amount of channels have concordantly measured the reading.

Error in the Program Code:

Each computation unit PU$^0$ ... PU$^P$, according to FIG. 3 has a program memory P$^0$ ... $^P$. There are two possibilities for uncovering errors in the program code which are stored in this:

Possibility 1: Each computation unit transmits the complete content of the program memory to all other computation units. These compare the received data to the content of their program reference memory PR$^0$ ... PR$^P$ and in the case of a difference initiate one or more of mentioned actions.

Possibility 2: Each computation unit has a self-test, with which it can test the content of the program memory with regard to consistency. If a computation unit ascertains an error in its own program memory, then it signalises this to the other computation units. These then initiate one or more of the mentioned actions.

Figure 9:
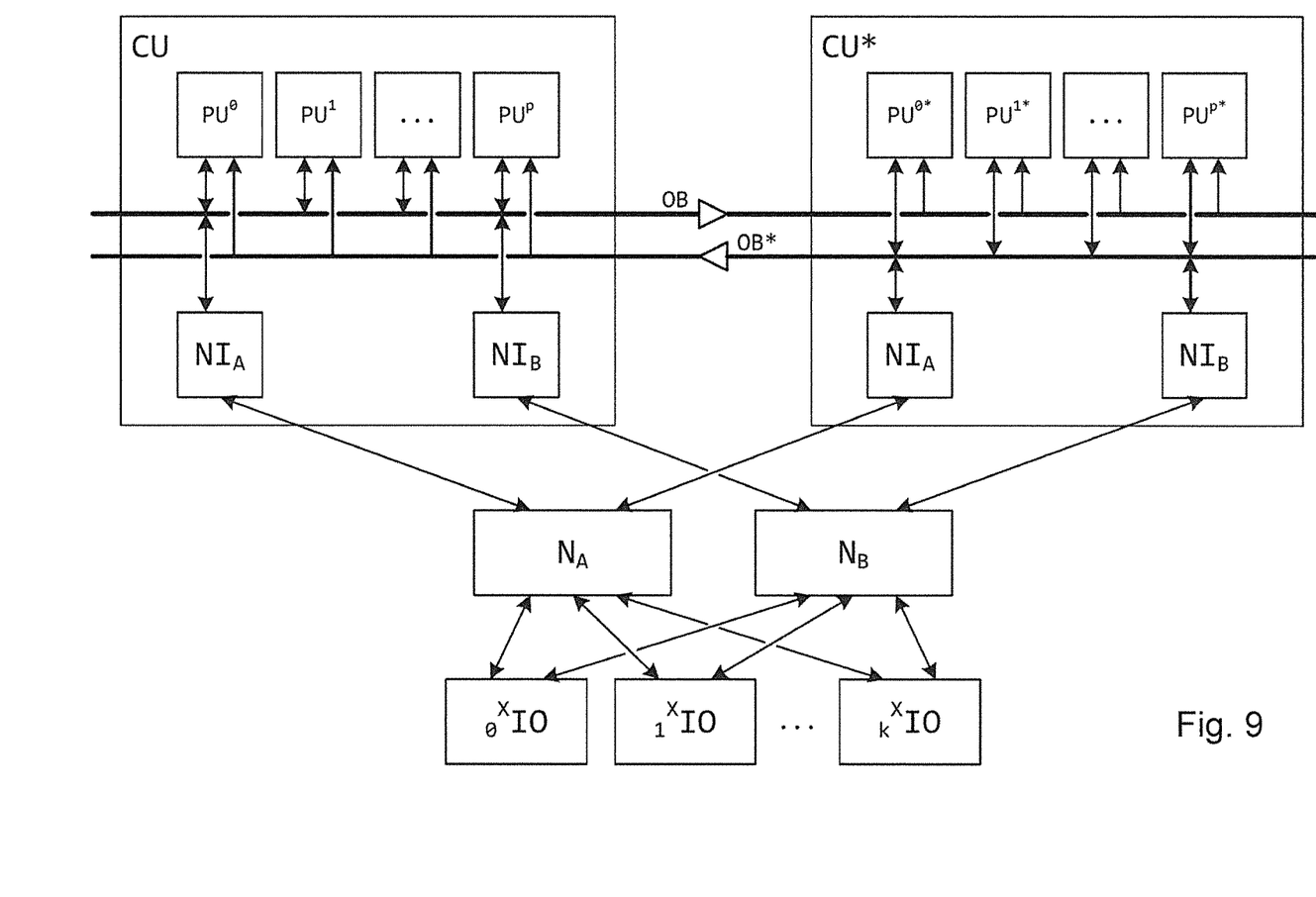
FIG. 9 a redundant system.

It is generally known that the availability of a computation system can be improved by way of a redundant computer. Such a redundancy concept, adapted to the present invention, is represented in FIG. 9. Redundancy as a safety feature is also present in the embodiment according to FIG. 3, by way of the system comprising several computation units which optionally can also be physically separated from one another. One can envisage the computation units being individually exchangeable, for which they can be optionally implemented on different circuit boards. The embodiment of FIG. 9 is aimed at the concept of the highest safety level, with which according to the first implementation, given an error (non-consistent output data, input data or state date or ascertained program error), the computer system is immediately counted as being unsafe and a corresponding reaction is activated Then, with the implementation according to FIG. 3, this results in the operation being interrupted and the complete system being made safe by way of activating the safety reaction. There are constellations, with which it would be undesirable, would not be tolerated (for example with the control of railway safety facilities, where the complete railway traffic would need to be stopped) or would even be dangerous (control of aircraft etc.).

In addition to the above-discussed possibility of ensuring operation in the case of errors by way of only demanding a minimum of data to be consistent (according to defined criteria), according to FIG. 9 there is also the possibility of providing two complete, operative computer systems according to the invention. Both computer systems CU and CU* are configured according to the invention and function for example according to the principle described above by way of FIGS. 3-8. The two computer systems can each be configured such that they can be serviced independently of one another, for example by way of the computation units and data memories etc. each being implemented on an individual circuit board or several individual circuit boards.

The complete redundant system accordingly comprises the central computer systems CU and CU* (a generalisation to more than two computer systems is possible without further ado). Both computer systems are constructed identically and have several computation units PU$^0$ ... PU$^P$ and PU$^{0*}$ ... PU$^{P*}$ respectively, which each form a channel. The system moreover has several I/O units $_0$IO ... $_k$IO or is at least configured to interact with such I/O units. The IO units are realised for example in a two-channel manner but are not necessarily constructed redundantly. Redundant I/O units are also possible for particularly important I/O tasks (e.g. communication with a superordinate control centre). The system additionally has 2 redundant networks N$_A$ and N$_B$ which are connected to the central units via 2 redundant network interfaces NI$_A$ and NI$_B$ and NI$_A$* and NI$_B$* respectively, so that individual errors cannot cripple the complete system.

In normal operation, one of the two redundant systems CU and CU* is the "boss" (master) and the other system follows (slave). Both systems operate 100% identically with the single exception that the master is that system which is in uninterrupted operation longer than the slave. The single difference in the processing is that the master sets the temporal procedure.

On starting operation of the complete system, the personnel firstly manually start one of the redundant central systems CU or CU*. The system started first of all automatically becomes the master. As soon as the slave is started and the program has loaded, then in each cycle it adopts the complete input and state data via the communication system OB or OB*. Both systems now run independently, but produce identical states and, from this, identical notices to the IO units. If for example an error in the program code of one of the computation units of the master occurs, then this master withdraws and the slave becomes the master. One proceeds in an analogous manner if a data error is ascertained.

The central system which has withdrawn is subsequently newly configured, for example by way of loading the program code or configuration code from the reference memory at each unit, from a source which is assigned to the central system or one which is external or from another central system.

As soon as this central system is operationally ready, in a cycle it adopts the input and state data of the new/current master via the communication system OB and OB*. The newly reactivated central system is now operationally ready as a slave and notifies this to the master and participates again with the following cycles.

If one of the computation units of the slave makes an error, then one proceeds analogously, i.e. the slave withdraws and participates again as a slave after it is operationally ready.

The respective computation unit can be completely switched off as soon as an indication of a hardware error is found with a program test or by way of repeatedly successively observed data errors or program errors. This can be supplemented by a hint to the user, whereupon the affected computation unit or possibly the complete circuit board comprising the computation unit is to be exchanged. If the system is designed in a sufficiently redundant manner, then under certain circumstances such an exchange can also be unnecessary and it is sufficient if the unit remains permanently switched off

The invention claimed is:

1. A computerised system, comprising a plurality of computation units, each computation unit configured to determine, autonomously and independently of the other computation units, in a calculation cycle, from an input vector which represents a discrete number of input variables, and from a state vector, which represents a discrete number of state variables, a new state vector whose state variables are updated compared to the state vector, as well as an output vector, which represents a discrete number of output variables,
and to cyclically repeat the step of determining in a plurality of calculation cycles with the updated state vector and a new, actual input vector;
wherein the system is configured for at least one of:
the output variables to be used for controlling at least one appliance,
for information based on the output vector to be output;
and wherein the system is configured such that at least all new state vectors are exchanged between the computation units after each cycle.

2. The system according to claim 1, wherein in addition to the state vectors, the output vectors and/or input vectors are also exchanged after each cycle.

3. The system according to claim 1, wherein each computation unit has its own bus, and wherein each computation unit is configured to transmit the state vector as well as, if applicable, the output vector and/or input vector to the remaining computation units via the own bus.

4. The system according to claim 1, wherein the received state vectors and, if applicable, output vectors and/or input vectors, by way of each of the computation units, are compared with their own vectors.

5. The system according to claim 4, which is configured to activate a safety reaction given a difference of one of the received vectors.

6. The system according to claim 5, wherein the safety reaction includes the result of none of the computation units of the system being taken into account for the control and/or for the output.

7. The system according to claim 1, wherein the computation units are configured to mutually transfer and examine a program code or configuration code.

8. The system according to claim 1, wherein each computation unit is configured, by way of a checksum computer, to form a checksum from the output vector and/or a subset of the output vector, said output vector comprising the output variables to be transferred to an output unit, wherein the checksum computers of the computation units differ.

9. The system according to claim 8, wherein the individual checksum computers use a different polynomial for computing the checksum.

10. The system according to claim 8, wherein the checksum computers compute with different initial vectors.

11. The system according to claim 1, wherein each computation unit independently computes a communication packet with an address, packet number, data and checksum, for each output unit of an envisaged number of output units.

12. The system according to claim 11, which is configured to join together the communication packets of the computation units into a total packet and to optionally supplement it with a global address and checksum.

13. The system according to claim 12 which is configured such that the total packet transmits redundant information only once.

14. The system according to claim 1, comprising a plurality of output units which are configured to each receive a value of at least one of the output variables and, depending on this, to output a command or information via an interface.

15. The system according to claim 14, wherein each computation unit is configured to form, by way of a checksum computer, a checksum from the output vector and/or a subset of the output vector, said output vector comprising the output variables which are to be transferred to the output unit, wherein the checksum computers of the computation units differ and wherein the output units are capable of checking whether a received data packet has correct checksums of all computation units.

16. The system according to claim 15, wherein the output units are configured to only carry out an output to the interfaces when all checksums of all computation units are correct.

17. The system according to claim 15, wherein the output units are configured to only carry out an output to the interfaces when a minimum number of checksums of all computation units are correct.

18. The system according to claim 1, wherein the computation units are assigned to a central system, comprising a network for connection of the central system to input and/or output units.

19. The system according to claim 18, comprising a second redundant network for increasing the availability.

20. A redundant system, comprising a first central system, being a system according to claim 1, and a second central system, being a system according to claim 1.

21. The redundant system according to claim 20, wherein the first and second central systems are configured to exchange at least all new state vectors with one another after each cycle.

22. The redundant system according to claim 21, wherein each central system is configured to go into a service mode if a comparison of the state vectors produced by the computation units of the central system or, if applicable, output vectors or input vectors results in a difference.

23. The redundant system according to claim 22, wherein in the service mode, the program of at least that computation unit which has produced data differing from the other computation units is newly loaded.

24. The redundant system according to claim 22, wherein that central system which returns from the service mode into an operating mode reassumes operation as a slave.

\* \* \* \* \*